United States Patent [19]

Wilson

[11] Patent Number: 4,921,405
[45] Date of Patent: May 1, 1990

[54] DUAL STRUCTURE TURBINE BLADE

[75] Inventor: Lloyd W. Wilson, Scottsdale, Ariz.

[73] Assignee: Allied-Signal Inc., Morris Township, Morris County, N.J.

[21] Appl. No.: 269,505

[22] Filed: Nov. 10, 1988

[51] Int. Cl.$^5$ .............................................. F01D 5/28
[52] U.S. Cl. ........................... 416/241 R; 416/219 R; 29/889.71; 148/11.5 N
[58] Field of Search ........... 416/219 R, 241 R, 213 R, 416/220 R, 221; 29/156.8 R, 156.8 B, 156.8 P

[56] References Cited

U.S. PATENT DOCUMENTS

| | | | |
|---|---|---|---|
| 2,920,007 | 1/1960 | Buckland | 416/241 R |
| 3,008,855 | 11/1961 | Swenson | 416/241 R X |
| 3,129,069 | 4/1964 | Hanink et al. | 29/183.5 |
| 3,494,709 | 2/1970 | Piearcey | 416/241 R |
| 3,549,273 | 12/1970 | Bird et al. | 416/241 R |
| 3,572,419 | 3/1971 | Barrow et al. | 164/60 |
| 3,573,963 | 4/1971 | Maxwell . | |
| 3,947,607 | 3/1976 | Gazzard et al. . | |
| 3,981,155 | 9/1976 | Kroebig . | |
| 4,033,792 | 7/1977 | Giamei et al. | 416/241 R |
| 4,292,010 | 9/1981 | Meetham et al. | 416/241 R |
| 4,418,124 | 11/1983 | Jackson et al. . | |
| 4,429,019 | 1/1984 | Schrewelius | 416/241 R X |
| 4,528,048 | 7/1985 | Gell et al. | 416/241 R |
| 4,574,451 | 3/1986 | Smashey et al. . | |
| 4,677,035 | 6/1987 | Fiedler et al. | 428/680 |
| 4,683,148 | 7/1987 | Rairden, III . | |
| 4,721,540 | 1/1988 | Harris et al. | 148/404 |

Primary Examiner—Everette A. Powell, Jr.
Attorney, Agent, or Firm—R. Steven Linne; James W. McFarland; Robert A. Walsh

[57] ABSTRACT

A single crystal turbine blade has a portion of its attachment section layered with a fine grained, poly-crystalline alloy. The blade is prepared by casting a single crystal body with an undersized attachment section, and then layering the attachment section with the poly-crystalline superalloy to form a composite structure. Layering is preferably accomplished by plasma spraying the body with the superalloy, and hot isostatically compacting the sprayed superalloy to minimize porosity. The composite structure is then heat treated to develop an optimized microstructure in the dual alloy attachment section. The polycrystalline material in the attachment section may be machined to a firtree shape for mounting in a turbine wheel. The resulting turbine blade has improved life resulting from reduced low cycle, low temperature fatigue susceptibility of, and crack growth in, the composite attachment section.

17 Claims, 1 Drawing Sheet

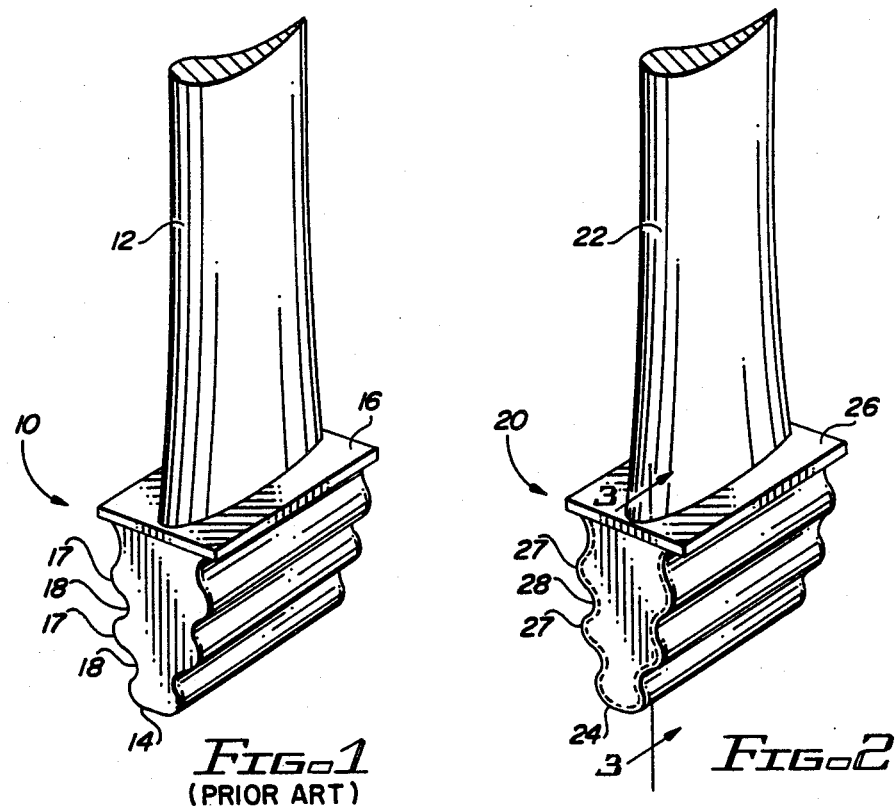
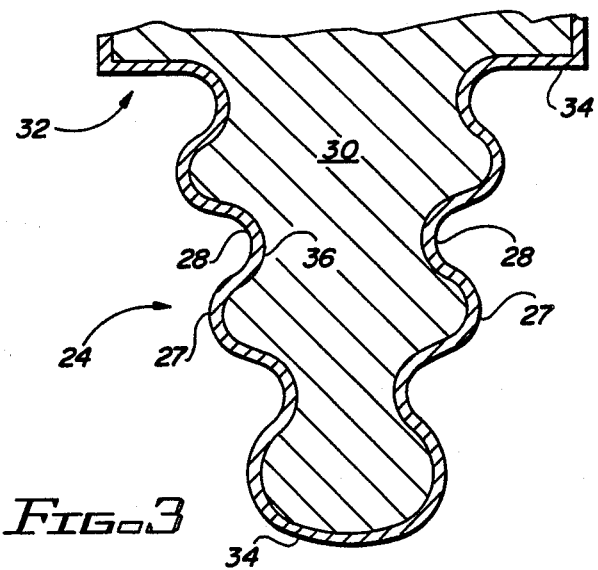

DUAL STRUCTURE TURBINE BLADE

TECHNICAL FIELD

This invention relates generally to gas turbine power plants, and, more particularly, to turbine blades used in high performance gas turbine engines.

BACKGROUND OF THE INVENTION

Gas turbine power plants are used as the primary propulsive power source for aircraft, in the forms of jet engines and turboprop engines, as auxiliary power sources for driving air compressors, hydraulic pumps, etc. on aircraft, and as stationary power supplies such as backup electrical generators for hospitals and the like. The same basic power generation principles apply for all of these types of gas turbine power plants. Compressed air is mixed with fuel and burned, and the expanding hot combustion gases are directed against stationary turbine vanes in the engine. The vanes turn the high velocity gas flow partially sideways to impinge upon turbine blades mounted on a turbine disk or wheel that is free to rotate.

The force of the impinging gas causes the turbine disk to spin at high speed. The power so generated is then used to draw more air into the engine in the case of the jet propulsion engine, and both draw more air into the engine and also supply shaft power to turn the propeller, an electric generator, or for other uses, in the cases of the other applications. The high velocity combustion gas is then passed out the aft end of the gas turbine to supply a forward reaction force, in the propulsion engine applications.

The turbine blades and vanes lie at the heart of the power plant, and it is well established that in most cases they are the limiting factors in achieving improved power plant efficiency. In particular, because they are subjected to high heat and stress loadings as they are rotated and impacted by the hot gas, there is a continuing effort to identify improvements to the construction and processing of turbine blades to achieve ever higher performance.

Much research and engineering has been directed to the problem of improved turbine blade performance. The earliest turbine blades were made of polycrystalline alloys having relatively low maximum operating temperatures. The alloy materials have been significantly improved over a period of years, resulting in various types of nickel-based and cobalt-based superalloys that are in use today.

As the alloy materials were improved, the metallurgical microstructure of the turbine blades was also improved. First, the polycrystalline grain structures were modified by a wide variety of treatments to optimize their performance. Directionally solidified or oriented polycrystalline blades were then developed, having elongated grains with deformation-resistant orientations parallel to the axis of the blade in order to best resist the centrifugal stresses. Each of these advancements led to improved performance of the blades. Polycrystalline and oriented polycrystalline blades are widely used in most commercial and many military aircraft engines today.

More recently, single crystal turbine blades have been introduced as a result of the development of practical techniques to cast them. These turbine blades have the advantage of eliminating grain boundaries entirely, which are one of the important causes of creep deformation and failure of the airfoil. The elimination of grain boundaries allows the chemical composition of the single crystal blade to be adjusted to achieve improved creep and high-cycle fatigue performance at the highest engine operating temperatures. Single crystal turbine blades are now used in military aircraft and may eventually be introduced into commercial applications.

While the single crystal turbine blades have provided improved airfoil performance as compared with polycrystalline blades, they still exhibit problem areas. In many applications, the highly loaded attachment area is subject to low cycle fatigue failures. As a result, there is a continuing need to provide yet further improvements to achieve higher operating loads and lengthened operating lives in the blades used in high performance gas turbine engines. The present invention fulfills this need, and further provides related advantages.

It is therefore an object of the present invention to provide a novel turbine blade, and method of making same, which has an increased operating life.

Another object of the invention is to provide a single crystal turbine blade having a reduced susceptibility to failure in its attachment area.

A further object of the invention is to provide a composite structure in at least a portion of the attachment section of a single crystal turbine blade to retard crack initiation and/or crack growth in said portion.

SUMMARY OF THE INVENTION

The present invention resides in a gas turbine blade that utilizes a single crystal body optimized for high temperature performance of the airfoil section, and also has a modified metallurgical structure overlaying at least a portion of the attachment or root section in order to form a composite structure. The resulting turbine blade is physically interchangeable with prior blades, but has improved low cycle fatigue resistance in the attachment section. Various metallurgical treatments can be applied to optimize the performance of the attachment section.

In accordance with the present invention, a turbine blade comprises a single crystal body having an airfoil section and an attachment section, and a structural layer of a polycrystalline alloy bonded onto said attachment section.

A turbine blade may be conveniently described as having two sections, an airfoil section and an attachment or root section. The airfoil section is elongated and curved slightly into a shape suitable for reacting against the flow of the hot combustion gas. The root section attaches the airfoil section to the rotatable turbine disk or hub. The most widely used attachment is a "firtree" shape, wherein the attachment section of the blade has a series of enlarged ridges that fit into a conforming receptacle in the rim of the turbine disk. The blade is held in place by the physical interlocking of the ridges and the receptacle, yet is relatively easy to insert and remove when necessary.

The airfoil section of the turbine blade is susceptible to deformation by creep and failure by creep rupture induced by the centrifugal forces imposed upon the blade, and failure by high cycle (low amplitude) fatigue induced by the impingement of the hot gases. The single crystal alloys now in use have been optimized to resist these mechanisms of failure. However, it has been observed that the attachment section is susceptible to another, completely different failure mechanism, low cycle (high amplitude) fatigue. Existing single crystal turbine blades have their lives limited in some cases by this low cycle fatigue mode. Because the turbine blade single crystal alloy is optimized to resist other failure mechanisms, low cycle fatigue failure of the attachment section becomes a more prominent concern in high performance gas turbine engines.

While the inventor does not wish to be held to any particular theory, it is believed that the source of the low cycle fatigue performance improvement arises from the inherent differences between the single crystal and polycrystalline microstructures. Low cycle fatigue occurs under conditions of high cyclic load and the related large plastic strains. The absence of grain boundaries in the single crystal has the effect of eliminating a major microstructural restraint to the growth of micro cracks which are formed during high plastic strain. The fine grained polycrystalline material resists crack growth via grain boundary interaction with the crack tip.

The turbine blade of the present invention has a single crystal body having a composition, orientation, and structure optimized to provide excellent creep and high-cycle fatigue resistance in the airfoil section. This blade is grown by existing single crystal growth techniques, such as those reported in U.S. Pat. Nos. 4,412,577 and 3,494,709, whose disclosures are incorporated herein by reference. However, the blade is grown with the attachment section undersized, and with or without a firtree configuration.

A layer of a polycrystalline superalloy is applied to the attachment section. The thickness, composition and microstructure of the layer are optimized to be resistant to low cycle, moderate temperature fatigue damage and other failure mechanisms that are predominant in the attachment section. The entire attachment section is not made of the polycrystalline material. The layering technique has been found to give good stress transfer into the blade and also extend the turbine blade life by delaying the onset of the fatigue failure mechanism that depends greatly on initiation at the surface of the attachment section rather than in its interior. The layer is a relatively thin coating, typically about 0.01 to 0.10 inches (or about 1 to 3 mm) thick. The firtree attachment configuration is then machined into the layer, taking care that the firtree configuration does not extend into the single crystal region underlying the attachment section of the blade at high stress locations.

The polycrystalline layer can be applied by any number of techniques, but preferably by plasma spraying. The layer material can then be metallurgically refined or altered after layering is complete. Subsequent processing can further improve the microstructure to be resistant to failure, for example by hot isostatic pressing, heat treating, or even shot peening. Such severe subsequent processing is not usually possible with prior single crystal attachment sections, as the single crystal microstructure had to be preserved without stress induced recrystallization.

In accordance with the processing aspect of the present invention, a process for preparing a turbine blade comprises the steps of casting a single crystal body having an airfoil section and an attachment section, layering the attachment section with a polycrystalline alloy, metallurgically refining the polycrystalline layer and then machining the attachment section into a desired configuration. In a preferred approach, a process for preparing a turbine blade comprises the steps of casting a single crystal body having an airfoil section and an attachment section, plasma spraying a layer of a polycrystalline alloy onto the attachment section, and hot isostatic pressing the body to consolidate the polycrystalline alloy layer.

In the most preferred approach, the single crystal portion of the blade is of SC180 composition superalloy having a [001] crystallographic orientation parallel to the blade's longitudinal axis. The polycrystalline coating is preferably of MAR M-247 superalloy since its composition is compatible to SC180. The polycrystalline layer is applied by vacuum plasma spray deposition and then consolidated by hot isostatic pressing, so that the layer is dense and well bonded to the single crystal portion of the attachment section and has an ASTM grain size of about 6 to 8.

It will be appreciated that the turbine blade of the invention achieves improved performance and life by incorporating the best features of two different approaches, while minimizing the detractions of each. Optimized airfoil section performance is attained by using an optimized single crystal alloy, and optimized attachment section performance is attained by using an optimized polycrystalline alloy in the surface layer to reduce incidence of low cycle fatigue failure. This composite structure behaves in a complex fashion which is not entirely predictable by only considering the individual properties of the single crystal material or the polycrystalline material. Initially the polycrystalline layer resists the centrifugal stresses but after some creep, the stresses are transferred into the single crystal core. Other features and advantages of the present invention will be apparent from the following more detailed description of a presently preferred embodiment, taken in conjunction with the accompanying drawings, which illustrate, by way of example, the principles of the invention.

BRIEF DESCRIPTION OF THE DRAWINGS

FIG. 1 is a perspective view of a conventional single crystal turbine blade;

FIG. 2 is a partial perspective view of a single crystal turbine blade of the present invention; and FIG. 3 is an enlarged sectional view of the attachment region of the blade shown in FIG. 2.

DETAILED DESCRIPTION OF THE PREFERRED EMBODIMENT

By way of background, FIG. 1 illustrates a prior single crystal turbine blade (10). The blade (10) has an airfoil section (12), an attachment or root section (14), and, usually, a platform or stabilizer (16) between the two sections. The attachment section (14) has the pattern of alternating ridges (17) and depressions (18) that form a "firtree" shape for attachment to a turbine disk (not shown). The blade (10) is fabricated entirely of a piece of single crystal superalloy, typically with a [001] crystallographic direction parallel to the blade's longitudinal axis.

As used herein, a single crystal article is one in which substantially all of the article has a single crystallographic orientation through the load bearing portions, without the presence of high angle grain boundaries. A small amount of low angle grain boundaries, such as tilt or twist boundaries, are permitted within such a single crystal article, but are preferably not present. However, such low angle boundaries are often present after solidification and formation of the single crystal article, or after some deformation of the article during creep or other light deformation process. Other minor irregularities are also permitted within the scope of the term "single crystal". For example, small areas of high angle grain boundaries may be formed in various portions of the article, due to the inability of the single crystal to grow perfectly near corners and the like. Such amount of deviation from a perfect single crystal, which are found in normal commercial production operations and use of the articles, are within the scope of the term "single crystal" as used herein.

FIG. 2 illustrates a dual alloy, dual structure turbine blade (20), which also has an airfoil section (22), an attachment section (24), and a platform or stabilizer (26). The attachment section (24) has a firtree of the same outward configuration and dimensions as the firtree of the prior blade (10). The physical appearance and configuration of the blade (20) is preferably identical with that of the prior blade (10), so that the improved blade can directly replace the prior blade in existing turbine wheels.

From the enlarged cross-sectional illustration of FIG. 3, however, it is apparent that the structure of the blade (20) differs from that of the blade (10). The airfoil sections (12) and (22) are identical, but the attachment sections (14) and (24) are not metallurgically identical. The attachment section (24) is preferably formed with an undersized core (30) that may or may not have a firtree shape. The core (30) is formed undersized, that is, of a size smaller than required to be anchored into a turbine disk. The core (30) preferably tapers from a thicker section adjacent the platform intersection (32), to a thinner section remote from the intersection (36).

Overlying the tapered core (30) is a polycrystalline metallic alloy layer (34). The layer (34) has its external configuration machined with the same ridges (27) and grooves (28) shaped as the prior art blade (10). The coating is preferably fine grained, having an ASTM grain size of about 6.5 to 8.5, to minimize initiation of low cycle fatigue cracks therein, and particularly at the surface forming the ridges (27) where the highest stress occurs.

The polycrystalline metallic alloy layer (34) must be well bonded to the single crystal along the interfacial bond lines (36). Examination of photomicrographs of the region including a bond line (36), with the single crystal region of the tapered base (30) and the coating (34) on either side of the bond line (36) shows there is no porosity at the interface, and only minor amounts of oxides and other contamination. The microstructures of the single crystal and the polycrystalline material are virtually undisturbed at even short distances on either side of the bond line.

The single crystal material may be any acceptable superalloy that can be prepared as a single crystal. The preferred single crystal materials are those that have compositions tailored to yield optimal properties in the single crystal form. The most preferred single crystal material is an alloy known as SC180, which in its most preferred form has a nominal composition of about 10% Co, 5% Cr, 1.7% Mo, 5% W, 8.5% Ta, 5.5% Al, 3% Re, 0.8% Ti, 0.1% Hf and the balance, nickel. The crystalline orientation of the single crystal is preferably with the [001] direction parallel to the blade's axis. Other acceptable single crystal materials are well known in the art. See, for example, U.S. Pat. Nos. 4,582,548; 4,643,782; and 4,719,080.

The polycrystalline material for use in the coating (34) may be any acceptable superalloy that can be prepared with a fine grain. The preferred polycrystalline materials are those that have compositions, grain sizes, and processing optimized to yield maximum performance as an attachment section alloy. This criterion implies an alloy having excellent low cycle fatigue performance. The most preferred polycrystalline material is MAR M-247, which has a nominal composition of about 10% Co, 8.5% Cr, 0.65% Mo, 10% W, 3.3% Ta, 5.5% Al, 1.5% Hf, 1.0% Ti and minor amounts of B, C, and Zr in a nickel matrix. This alloy most preferably has an ASTM grain size of from about 7 to about 10, as this grain size range is known to be highly resistant to low cycle fatigue failure. In addition, the chemical composition is similar enough to SC180 to minimize phase instability near the interfacial bond line (36). Other acceptable coating superalloys include, but are not limited to wrought disk alloys such as U-720, Waspoloy, IN-100, and Astroloy.

The turbine blade of the invention is fabricated by first preparing a single crystal piece having the shape of the airfoil section (22), platform (26), and tapered core (30).

Any fabrication technique which produces a substantially single crystal article is operable in conjunction with the present invention. The preferred technique, used to prepare the single crystal articles described herein, is the high thermal gradient solidification method. Molten metal of the desired composition is placed into a heat resistant ceramic mold having essentially the desired shape of the final fabricated component. The mold and metal contained therein are placed within a furnace, induction heating coil, or other heating device to melt the metal, and the mold and molten metal are gradually cooled in a controlled temperature gradient. In this process, metal adjacent the cooler end of the mold solidifies first, and the interface between the solidified and liquid metal gradually moves through the metal as cooling continues. Such gradient solidification can be accomplished by placing a chill block adjacent one end of the mold and then turning off the heat source, allowing the mold and molten metal to cool and solidify in a temperature gradient. Alternatively, the mold and molten metal can be gradually withdrawn from the heat source.

It is known that certain preferred crystallographic orientations such as [001] can be grown to the exclusion of others during such a gradient solidification process, so that a single grain becomes dominant throughout the article. Techniques have been developed to promote the formation of the single crystal orientation rapidly, so that substantially all of the article has the same single crystal orientation. Such techniques include seeding, described in U.S. Pat. No. 4,412,577, whereby an oriented single crystal starting material is positioned adjacent the metal first solidified, so that the metal initially develops that orientation. Another approach is a geometrical selection process such as described in U.S. Pat. No. 3,494,709.

As indicated, all other techniques for forming a single crystal are acceptable for use in conjunction with the present invention. The floating zone technique may be used wherein a molten zone is passed through a polycrystalline piece of metal to produce a moving solidification front. Solid state techniques are also permitted wherein a solid piece of polycrystalline material is transformed to a single crystal in the solid state. The solid state approach is not preferred because it is typically slow and produces a relatively imperfect single crystal.

The polycrystalline layer (34) is applied by any technique that produces a sound microstructure that is well bonded to the underlying single crystal substrate. The preferred approach is vacuum plasma spray deposition. The target to be coated, here the tapered core (30) of the blade (20), is placed into a vacuum chamber which is evacuated to a relatively low pressure. A plasma gun that melts metal fed thereto is aimed at the target substrate, typically positioned several inches from the plasma gun. Particles of metal of the desired final composition are fed to the plasma gun, which melts, or at least softens, the particles and propels them toward the target to impact thereupon. Different blends of particles can also be used, but a single particulate feed material is preferred for uniformity.

The plasma coating is continued for as long as necessary to build up a layer of desired thickness. By way of example and not of limitation, a typical blade (20) may be 2 to 4 inches long, and the thickness of the layer (34) is about 0.05 to 0.10 inches before final machining.

The as-deposited layer is observed to have a slight degree of porosity and possibly unmelted particles. To remove the porosity and irregularities, the coated blade (20) is placed into a pressure chamber and hot isostatically pressed. The hot isostatic pressing is conducted at an elevated pressure, typically 15,000 to 25,000 pounds per square inch, and an elevated temperature, typically 1975° F. to 2230° F., for a sufficient time, such as 4 hours. The exact temperature and time may vary depending upon heat treatment requirements for the single crystal and the layered materials. An acceptable and preferred hot isostatic pressing treatment is 2230° F. and 15,000 pounds per square inch for 4 hours. Upon completion of this treatment of the preferred combination of SC180 single crystal and MAR M-247 coating, the porosity in the coating is completely closed, and there is good bonding at the bond line (36). After pressing, the composite blade is preferably solution heat-treated and aged at about 2300° F. to 1200° F. (more preferably 1400° F. to 1600° F.) to optimize the polycrystalline microstructure. Care must be taken to avoid incipient melting of the single crystal material, and the appropriate combination of pressing and heat treatment parameters will depend upon the materials selected for the single crystal and polycrystalline layer in any particular case.

Any other acceptable procedure may also be used to coat the single crystal material with the polycrystalline material. Such other techniques include, but are not limited to, vapor deposition, plasma transfer arc, electrodeposition, deposition from solution, and powder spraying.

As will now be appreciated, the turbine blades of the invention provide improved structure and performance as compared with prior blades. Although a particular embodiment of the invention has been described in detail for purposes of illustration, various modifications may be made without departing from the spirit and scope of the invention. Accordingly, the invention is not to be limited except as by the appended claims.

What is claimed is:

1. A composite turbine blade structure, comprising:
    a single crystal body having an airfoil section and an attachment section; and
    a layer of a polycrystalline alloy bonded onto at least a portion of said attachment section.
2. The turbine blade of claim 1 wherein the polycrystalline alloy is MAR M-247.
3. The turbine blade of claim 2 wherein the grain size of the polycrystalline alloy is less than about ASTM 6 and the layer has a thickness of from about 0.01 to 0.10 inches.
4. The turbine blade of claim 1 wherein the polycrystalline alloy is U-720.
5. The turbine blade of claim 1 wherein the orientation of the single crystal material has its (001) axis parallel to the long axis of the blade section.
6. A process for manufacturing a composite turbine blade, comprising the steps of:
    casting a single crystal body having an airfoil section and an attachment section;
    plasma spray-coating the attachment section with a polycrystalline alloy layer; and
    metallurgically refining the polycrystalline layer.
7. The process of claim 6 wherein said refining step includes consolidating the polycrystalline alloy layer by hot isostatic pressing.
8. The process of claim 6 wherein said refining step includes microstructural optimization of the composite blade by heat treatment processing.
9. The process of claim 6 wherein said refining step includes hot isostatic pressing followed by heat treating so that the microstructure of the polycrystalline layer is consolidated and fine grained.
10. The process of claim 6 wherein said single crystal body has a nominal composition of SC180 and said polycrystalline alloy has a composition of MAR M-247.
11. The process of claim 10 wherein said refining step includes isostatic pressing the composite blade at about 2230° F. and 15,000 pounds per square inch pressure for about 4 hours.
12. The process of claim 11 further including heat treating the hot pressed blade at about 1600° F. to refine the polycrystalline microstructure.
13. The process of claim 6 wherein said polycrystalline alloy has a composition of U-720 and said refining step includes heat treating the composite blade at about 1600° F. and again at about 1400° F.
14. The process of claim 6 wherein said single crystal body is a nickel base superalloy and said polycrystalline alloy is selected from the group consisting of MAR M-247, U-720, IN-100, Astroloy and Waspoloy.
15. A process for increasing the fatigue life of a turbine blade comprising the steps of:
    casting a single crystal body having an airfoil section and an attachment section;
    plasma spraying a layer of a polycrystalline alloy onto the attachment section; and
    hot isostatic pressing the body to consolidate the polycrystalline alloy.
16. The process of claim 15 further including the step of heat treating the blade to optimize the microstructure of the polycrystalline layer.
17. The process of claim 16 wherein said polycrystalline alloy is MAR M-247 and said heat treating is performed between about 1200° F. and about 2300° F.

* * * * *